United States Patent Office 3,510,617
Patented May 5, 1970

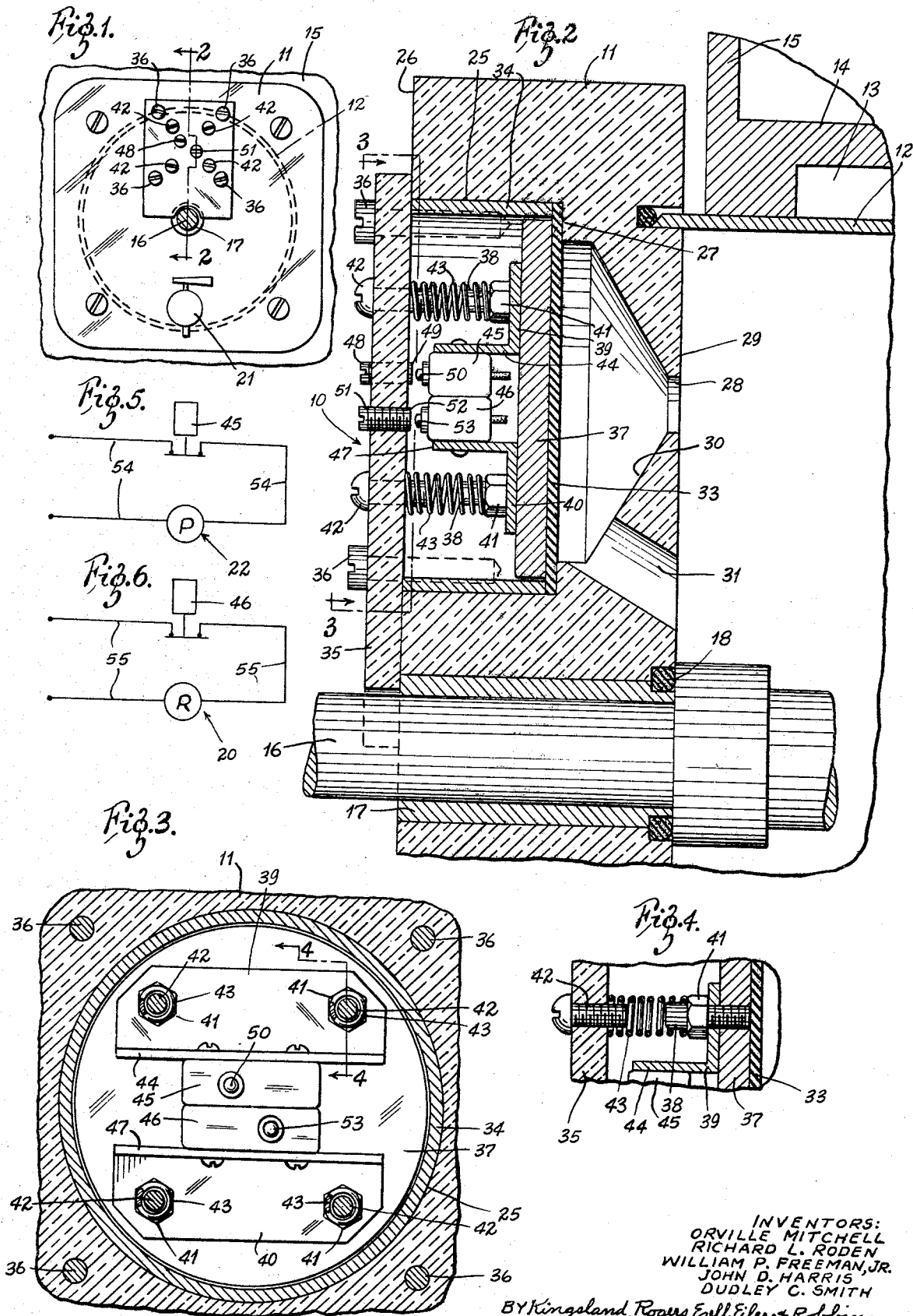

3,510,617
DUAL ACTION PRESSURE SWITCH
Orville Mitchell, Richard L. Roden, William P. Freeman, Jr., John D. Harris, and Dudley C. Smith, Dallas, Tex., assignors to John E. Mitchell Company, Dallas, Tex., a corporation of Missouri
Filed Oct. 25, 1968, Ser. No. 770,640
Int. Cl. H01h 35/40
U.S. Cl. 200—83                                     6 Claims

ABSTRACT OF THE DISCLOSURE

A dual action pressure switch for responding to pressure conditions within a freezing chamber of the kind that prepares a semi frozen drink or confection from liquid flavoring and carbon dioxide ingredients to control the operation of the ingredient pump under one set of pressure conditions and to control operation of the refrigeration system under another set of pressure conditions different from the first set. A dual action pressure switch mounted in a transparent face plate of the dispensing machine for visual inspection of its operation and for direct response to the pressure conditions within the freezing chamber.

BRIEF DESCRIPTION OF THE INVENTION

This dual actuation pressure switch is connected to control a pump that supplies drink ingredients to a freeze chamber and to control the operation of a refrigeration system that refrigerates the ingredients within the freeze chamber, both in response to the pressure conditions within the free chamber. The switch is mounted in a face plate that closes an end of the freeze chamber.

The are two microswitches, one connected into the pump circuit, and the other connected into the refrigeration system circuit. The microswitches are mounted on a movable wall that is biased against a diaphragm by a plurality of compression springs. The opposite side of the diaphragm is exposed to the pressure within the freeze chamber. The microswitches are normally closed and each is opened when its actuator moves into engagement with a set screw. The actuating set screws are set to actuate the pump control microswitch first when pressure within the chamber increases to a first predetermined level and thereafter to actuate the refrigeration control microswitch upon increase in the pressure to a second predetermined level. The difference between these pressure levels can be adjusted so that the desired amount of refrigeration takes place to produce desired drink consistency.

When a drink is dispensed from the freeze chamber, the pressure therein reduces, permitting the plate to move the microswitches away from engagement with their respective set screws to repeat the cycle. When no drink has been dispensed, the diaphragm moves back and forth by small increments the the pressure within the chamber varies with refrigeration of the ingredients. By this movement of the diaphragm, the refrigeration system is controlled to maintain the desired drink consistency prior to dispensing a drink.

BRIEF DESCRIPTION OF THE DRAWING

FIG. 1 is a fragmentary front elevation view of the freeze chamber with the dual action pressure switch mounted on the face plate.

FIG. 2 is an enlarged fragmentary view in section taken along line 2—2 of FIG. 1.

FIG. 3 is a fragmentary view in section taken along line 3—3 of FIG. 2.

FIG. 4 is a fragmentary view in section taken along line 4—4 of FIG. 3.

FIG. 5 is a schematic wiring diagram of the pump circuit.

FIG. 6 is a schematic wiring diagram of the refrigeration circuit.

DETAILED DESCRIPTION OF THE INVENTION

As shown in FIG. 2, the dual action pressure switch 10 is mounted in the face plate 11 that is mounted (by measurements shown) to the front end of a freezing chamber 12. The freezing chamber 12 is of the kind shown in Mitchell et al., application Ser. No. 615,722, now U.S. Pat. No. 3,403,524 filed Feb. 13, 1967, and Mitchell et al., application Ser. No. 724,730, filed Apr. 29, 1968, both assigned to the assignee of this invention. In brief, the freezing chamber 12 contains confection or drink ingredients which are refrigerated by the circulation of a cooling medium through appropriate channels 13 circuited about the outer surface of the chamber 12 and defined by appropriate walls 14 and 15. A shaft 16 that is journalled in a bushing 17 extended through the face plate 11, with suitable seal means 18, supports an agitator (not shown) that revolves within the chamber 12 as described in the aforementioned applications.

The ingredients within the chamber 12 are cooled to a desired consistency by the operation of the refrigeration system 20, shown in the circuit of FIG. 6, and this consistency is one that results in semi-frozen carbonated beverages wherein the frozen portion consists of tiny frozen particles. When the confection or drink is dispensed from a dispensing valve 21, shown schematically in FIG. 1, the water, syrup and carbon dioxide ingredients are replenished by operation of a pump 22, shown in the circuit of FIG. 5.

As already mentioned, the switch 10 is mounted in the face plate 11. The face plate 11 may be made of any desired material, but a thick plate of Plexiglas is desirable because of its transparency which enables the machine operator as well as the customer to observe the contents within the chamber 12.

The face plate 11 is bored to form a cylindrical recess 25 extending from the front surface 26 of the face plate 11 to an annular shoulder 27. There is an opening 28 from the rear surface 29 of the face plate 11 extending in a converging wall 30 to terminate at the annular shoulder 27. A drain passage 31 extends downwardly from the area within the diverging wall 30.

A flexible diaphragm 33 is pressed tightly against the annular shoulder 27 by a retainer sleeve 34. The retainer sleeve 34 is held in place by a Plexiglas cover plate 35 fastened by screws 36 to the face plate 11. A metal disk 37 has studs 38 extending forwardly for supporting two angle members 39 and 40 held in place by nuts 41. There are bolts 42 threaded through the cover plate 35 with their shaft positions opposite the studs 38. Compression springs 43 are mounted between the bolts 42 and the studs 38 to bias the metal disk 37 against the diaphragm 33.

The angle member 39 has a forwardly extending leg 44 on which a microswitch 45 is mounted. A similar microswitch 46 is mounted on forwardly extending leg 47 of the angle member 40. A set screw 48 is threaded through the cover plate 35 with its end 49 positioned opposite the actuator button 50 of the microswitch 45. A similar stud 51 is threaded through the cover plate 35 with its end 52 opposite the actuator button 53 of the microswitch 46.

As indicated in FIG. 5, the microswitch 45 is normally closed and is connected by wires 54 in a circuit with the pump 22 across a suitable power supply. The microswitch 46 is also a normally closed switch and is connected by wires 55 in a circuit with the refrigeration system 20 across a power supply.

OPERATION

The springs 43 continually bias the metal disk 37 against the diaphragm 33 and, when the pressure within the freezing chamber 12 is low, the diaphragm 33 occupies the position illustrated in FIG. 2, with the switch actuator buttons 50 and 53 out of engagement with the set screws 48 and 51. Since the microswitches 45 and 46 are normally closed switches, during this relatively low pressure condition within the freezing chamber 12, the circuits to both the pump 22 and the refrigeration system 20 are closed. Therefore, water, flavoring and carbon dioxide ingredients for the confection or drink are pumped by the pump 22 into the freezing chamber 12. Also, the refrigeration system 20 operates to circulate cooling fluid through the passages 13 to refrigerate the ingredients within the chamber 12.

As the chamber fills to capacity, the pressure within the chamber increases. It should be noted that the pressure within the chamber 12 is maintained at a high level by the pressure of the carbon dioxide which normally applies a pressure in the range of two atmospheres. As this pressure increases, it is transmitted through the opening 28 to the diaphragm 33 in opposition to the force of the springs 43. As the pressure increases a sufficient amount, indicating that the freezing chamber is filled to a predetermined capacity, the diaphragm 33 moves to the left, moving the metal disk 37 and the microswitches 45 and 46 to the left until the microswitch 45 engages the end 49 of the set screw 48 and its actuator button 50 is depressed. Depression of the actuator button 50 opens the microswitch 45 and therefore opens the circuit to the pump. This means that the pump 22 interrupts its supply of drink or confection ingredients to the freezing chamber 12.

The set screw 51 is adjusted so that, at the point at which the microswitch 45 is actuated by the set screw 48, the actuator button 53 has not yet reached the end 52 of the set screw 51. Accordingly, the refrigeration system 20 continues operating to continue to refrigerate the ingredients within the chamber 12.

As the refrigeration of ingredients continues, the pressure within the freezing chamber 12 continues to increase because of the characteristic of water to expand as its temperature is reduced below about 38° F. to and below its freezing point before it contacts with still further refrigeration. The set screw 51 is adjusted to interrupt operation of the refrigeration system, when the chamber pressure has increased, indicating that the desired consistency within the freezing chamber has been reached. In other words, continued refrigeration after opening of the pump circuit moves the diaphragm 33 still farther to the left, with the actuator button 53 being actuated by the end 52 of the set screw 51 to open the microswitch 46 and open the circuit of the refrigeration system 20.

Now, if no drink is withdrawn from the freezing chamber 12, the refrigeration system 20 will remain inoperative until the temperature within the freezing chamber 12 rises to a level at which the pressure within the chamber has reduced to permit the springs 43 to bias the diaphragm 33 somewhat to the right against the pressure within the chamber 12. This disengages the actuator button 53 to again close the circuit to the refrigeration system. The refrigeration system will be cycled in the foregoing manner during the time drinks are not dispensed.

When drinks are dispensed through the dispensing valve 21, the pressure within the freezing chamber 12 drops still farther. This drop in pressure causes the diaphragm 33 to be moved to the right under the force of the springs 43 to disengage both the actuator button 50 and the actuator button 53 from their respective set screws 48 and 51. As a result, both the circuits to the pump 22 and the refrigeration system 20 are closed so that additional ingredients are supplied to the freezing chamber 12 and the refrigeration system 20 operates to cool these ingredients, thereby repeating the foregoing operation.

This dual action pressure switch can be adjusted as desired by simply turning the set screws 48 and 51. Ordinarily, the incremental pressure between the level at which the pump 22 is disengaged and the level at which the refrigeration system 20 is disengaged is less than 1 pound per square inch. The set screws 48 and 51 are set to give this desired pressure differential which ordinarily means that the movement of the diaphragm 33 following actuation of the actuator button 50 will be about $\frac{1}{16}$ inch before the actuator button 53 is actuated.

It is apparent that this invention provides a very accurate control of the pump 22 and the refrigeration system 20 in response to pressure conditions within the freezing chamber 12. The switch 10 is also conveniently mounted in the face plate 11 for direct response to these pressure conditions. Also, since the cover plate 35 and the face plate 11 are both preferably of transparent material, the machine operator and the consumer can watch the operation take place.

Various changes and modifications may be made within this invention as will be readily apparent to those skilled in the art. Such changes and modifications are within the scope and teaching of this invention as defined by the claims appended hereto.

We claim:

1. A dual action pressure switch for controlling operation of a pump that supplies drink ingredients to a freeze chamber and for controlling operation of a refrigeration system that refrigerates the ingredients within the freeze chamber comprising a switch connected in the pump circuit, a switch connected in the refrigeration system circuit, a movable wall, means for mounting the switches to the movable wall, means for biasing the movable wall in a direction toward de-actuation of the switches, means exposing a side of the movable wall to the pressure conditions within the freeze chamber to bias the movable wall in a direction toward actuation of the switches, means to actuate the pump control switch upon increase in pressure within the freeze chamber to a first predetermined level, and means to actuate the refrigeration control switch upon increase in pressure within the freeze chamber to a second predetermined level, the second predetermined pressure level being higher than the first predetermined pressure level.

2. The dual action pressure switch of claim 1, including an adjustable set screw for actuation of each microswitch.

3. The dual action pressure switch of claim 1, wherein the freeze chamber includes an open front end, a face plate covering the open front end of the freeze chamber, a recess in the face plate, and means to mount the dual action pressure switch within the recess.

4. The dual action pressure switch of claim 3, including pressure communicating passage means between the freeze chamber and the movable wall.

5. The dual action pressure switch of claim 4 including a passage for draining drink ingredients from the pressure communicating passage.

6. A dual action pressure switch comprising a movable wall means, a fixed wall, means to mount the movable wall means for movement toward and away from the fixed wall, a plurality of switches, a plurality of actuators for actuating the switches, means for mounting the switches and actuators to the fixed wall and movable wall means with each actuator positioned opposite a switch for actuation of the switch upon movement of the movable wall means toward the fixed wall, means to bias the movable wall means in a direction away from the fixed wall, means to expose a side of the movable wall means to an area of pressure variation for moving the movable wall means toward the fixed wall upon increases in pressure, and means to independently vary the spacing between each actuator and the switch actuated thereby.

References Cited

UNITED STATES PATENTS 3,355,561  11/1967  Eby et al. ---------- 200—83
3,398,991  8/1968  Compton ---------- 200—83 X ROBERT K. SCHAEFER, Primary Examiner J. R. SCOTT, Assistant Examiner U.S. Cl. X.R.

200—153